No. 866,518. PATENTED SEPT. 17, 1907.
P. REPSOLD.
DRILLING APPARATUS FOR DENTISTS.
APPLICATION FILED JUNE 13, 1906. RENEWED AUG. 16, 1907.
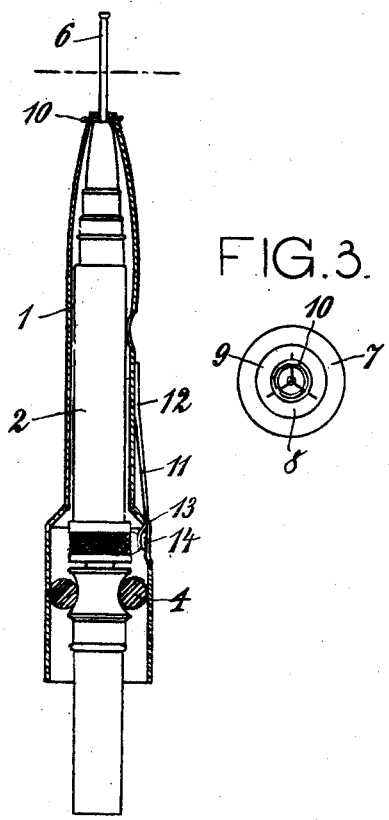
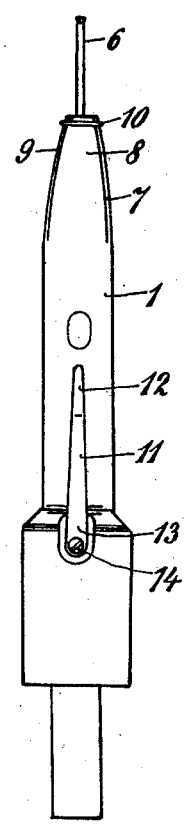
Witnesses:
O. Westermann
E. E. Potter
Inventor
Paul Repsold
by H. C. Evert & Co.
Attorneys.

UNITED STATES PATENT OFFICE.

PAUL REPSOLD, OF RIGA, RUSSIA.

DRILLING APPARATUS FOR DENTISTS.

No. 866,518.            Specification of Letters Patent.            Patented Sept. 17, 1907.

Application filed June 13, 1906, Serial No. 321,526. Renewed August 16, 1907. Serial No. 388,818.

*To all whom it may concern:*

Be it known that I, PAUL REPSOLD, a subject of the King of Prussia, residing at Riga, Russia, have invented certain new and useful Improvements in Drilling Apparatus, especially such as is suitable for the use of dentists, of which the following is a specification, reference being had therein to the accompanying drawings.

The invention relates to improvements in drilling apparatus, particularly such as is suitable for the use of dentists.

In accordance with my invention there is provided a special holder or casing which is passed over the handle and the free end of which firmly grips the drill, while its lower end, which surrounds the handle, is separated therefrom by an elastic ring which damps the shocks and jerky movements of the drill and of its handle, and prevents the transmission thereof to the holder, with the result that the boring can be effected steadily and without shock.

The accompanying drawing illustrates by way of example, one constructional form of apparatus in accordance with this invention; Figure 1 being a vertical longitudinal section of the outer casing with the hand piece inserted therein, while Fig. 2 is an elevation and Fig. 3 is a top plan thereof.

The outer casing 1 which, as shown in the drawings, surrounds the hand piece 2, has a fore end of tapered form, resembling that of the fore end of the hand piece, with which however, it does not come into contact at any point. The fore end of the outer casing is furnished with several slots, while its rear end is mounted on a rubber ring 4, in such a manner as to provide an elastic connection between the rear ends of outer casing and hand piece.

The drill 6 which is embraced by the three spring tongues 7, 8 and 9 moves in the perforated end of the outer casing; and as it would be difficult to press these tongues by means of the fingers with equal force against the drill, it is preferable to hold them firmly against the drill by means of a spring actuated ring 10, the user moreover, being then enabled to grip the outer casing as far as possible towards the rear; an advantage of considerable importance when a dental operation has to be performed at a point situated in a remote portion of the oral cavity.

The outer casing is longitudinally movable through a spring 11, which is suitably attached to the outer casing at 12 and which has its rear end 13 connected by a screw 14 with the hand piece 2.

What I claim as my invention and desire to secure by Letters Patent is:

1. Drilling apparatus comprising a drill, a hand piece therefor; arranged around said hand piece a tubular casing whose fore end is adapted to grip said drill; and, interposed between said casing and hand piece, an elastic pad.

2. Drilling apparatus comprising a drill; a hand piece therefor; arranged around said hand piece, a tubular casing whose fore end is adapted to grip said drill; interposed between said casing and hand piece an elastic pad; and a spring connection attached both to said hand piece and to said casing.

3. Drilling apparatus comprising a drill; a hand piece therefor; arranged around said hand piece, a tubular casing that at its fore end is divided into spring tongues; a ring adapted to cause said tongues to grip said drill, and interposed between said hand piece and casing, a resilient annular pad.

4. Drilling apparatus comprising a drill; a hand piece therefor; arranged around said hand piece, a tubular casing that at its fore end is divided into spring tongues; a ring adapted to press said tongues against said drill; interposed between said hand piece and casing, a resilient annular pad and, attached both to said hand piece and to said casing, a spring connection.

In testimony whereof I affix my signature in the presence of two witnesses.

PAUL REPSOLD.

Witnesses:
    PAUL V. LUHR,
    WALTER BAER.